United States Patent
Gendelman et al.

(10) Patent No.: US 11,378,929 B2
(45) Date of Patent: Jul. 5, 2022

(54) THREAT DETECTION SYSTEM FOR INDUSTRIAL CONTROLLERS

(71) Applicant: SI-GA DATA SECURITY (2014) LTD., Beer-Sheva (IL)

(72) Inventors: Ilan Gendelman, Arsuf-Kedem (IL); Amir Samoiloff, Omer (IL)

(73) Assignee: SI-GA DATA SECURITY (2014) LTD., Beer-Sheva (IL)

(*) Notice: Subject to any disclaimer, the term of this patent is extended or adjusted under 35 U.S.C. 154(b) by 269 days.

(21) Appl. No.: 16/627,378

(22) PCT Filed: Jun. 17, 2018

(86) PCT No.: PCT/IB2018/054446
§ 371 (c)(1),
(2) Date: Dec. 30, 2019

(87) PCT Pub. No.: WO2019/003041
PCT Pub. Date: Jan. 3, 2019

(65) Prior Publication Data
US 2020/0218221 A1    Jul. 9, 2020

Related U.S. Application Data

(60) Provisional application No. 62/525,760, filed on Jun. 28, 2017.

(51) Int. Cl.
*G05B 19/05* (2006.01)
*H04L 9/40* (2022.01)
*H04L 67/12* (2022.01)

(52) U.S. Cl.
CPC ........ *G05B 19/058* (2013.01); *H04L 63/0209* (2013.01); *H04L 63/1416* (2013.01); *H04L 67/12* (2013.01)

(58) Field of Classification Search
CPC ... G05B 19/058; G06F 21/554; G06F 21/566; H04L 63/0209; H04L 63/1408; H04L 63/1416; H04L 67/12
See application file for complete search history.

(56) References Cited

U.S. PATENT DOCUMENTS

2008/0155676 A1* 6/2008 Johnson ............ H04L 63/0209
726/13
2013/0152198 A1   6/2013 Akiyama et al.
(Continued)

FOREIGN PATENT DOCUMENTS

| EP | 3179322 | * | 6/2017 |
| EP | 3179323 A1 | | 6/2017 |
| KR | 101252358 B1 | | 4/2013 |

OTHER PUBLICATIONS

International Search Report in PCT/IB2018/054446, dated Oct. 4, 2018.
(Continued)

*Primary Examiner* — Kidest Bahta
(74) *Attorney, Agent, or Firm* — Manelli Selter PLLC; Edward Stemberger

(57) ABSTRACT

A threat detection system for industrial controllers, comprising: at least one Programmable Logic Controller (PLC); at least one physical device connected with the PLC; a Deterministic Fictitious Programmable Logic Controller (DFPLC) deterministically programmed to respond with at least one predetermined signal to at least one input signal received; and a monitoring unit connected with the DFPLC; the DFPLC disguised as a PLC; and the monitoring unit configured to send at least one input signal to the DFPLC, receive at least one response from the DFPLC and communicate at least one alert upon the at least one response being
(Continued)

other than an expected response according to the deterministic programming of the DFPLC.

3 Claims, 3 Drawing Sheets

(56) References Cited

U.S. PATENT DOCUMENTS

| | | |
|---|---|---|
| 2014/0189860 A1 | 7/2014 | Hull Roskos |
| 2016/0050225 A1 | 2/2016 | Carpenter et al. |
| 2016/0301709 A1* | 10/2016 | Hassanzadeh ...... H04L 63/1408 |
| 2019/0243977 A1* | 8/2019 | Pfleger de Aguiar . G05B 19/05 |
| 2019/0246977 A1* | 8/2019 | Miller ................. A61B 5/1455 |

OTHER PUBLICATIONS

Supplementary European Search Report in EP 18823706 dated Dec. 21, 2020.
Ken Yau et al., "PLC Forensics Based on Control Program Logic Change Detection", Journal of Digital Forensics, Security and Law, vol. 10, Jan. 1, 2015, pp. 2-10.

* cited by examiner

THREAT DETECTION SYSTEM FOR INDUSTRIAL CONTROLLERS

FIELD OF THE INVENTION

The present invention, in some embodiments thereof, relates to industrial control systems and, more specifically, but not exclusively, to monitoring of industrial control systems for security and maintenance.

CROSS-REFERENCE TO RELATED PATENT APPLICATIONS

This patent application claims priority from and is related to U.S. Provisional Patent Application Ser. No. 62/525,760, filed Jun. 27, 2017, this U.S. Provisional Patent Application incorporated by reference in its entirety herein.

BACKGROUND

Supervisory control and data acquisition (SCADA) systems, or any type of industrial control systems (ICSs), are where computer controlled systems interact with real-world processes by monitoring and controlling the analog and digital input and output from devices, such as pumps, valves, heaters, etc. ICSs are at the center of today's technological infrastructures. ICSs are used to control and monitor from the most crucial processes, such as infrastructures for power generation, electrical transmission grids, water distribution, and transportation control, down to low scale ventilation, heating, and gas control in public or private facilities.

ICSs are comprised of programmable logic controllers (PLCs), SCADA data networks, operator and supervisor terminals, management terminals, etc. The PLC devices are connected to physical devices, such as pumps, meters, valves, heaters, etc. and control these physical devices using hardware interfaces, such as analog and/or digital input and/or output (I/O) electrical conductor lines, referred to herein as I/O lines. The PLCs frequently use a system bus design to attach I/O modules to the PLC processing unit, and the I/O modules contain electronics to control the output conductors and perform measurements on the input conductors. By manipulating the I/O lines in a certain order, the operation of the facility is implemented. The physical devices are operated by the PLC according to embedded logic, and each PLC is designed to work autonomously, often in groups where each PLC might control part of the process. Select information and statuses gathered by the PLCs are transferred to operator and/or supervisor terminals who have limited control of the operations according to predefined constraints, such as manual overrides of certain devices and/or operations when needed. Higher level information is transferred to management terminals for executive monitoring of the operations.

ICSs may be described as control systems where most of the logic is performed on the level of the PLCs, which have exclusive real world connection to the physical devices. The PLC's operational logic runs automatically in real time till the logic is changed, parameters are changed, or a manual override is sent from a control terminal. ICSs are designed to provide high reliability and environmental protection, and major efforts were done to reach high values of mean time between failures (MTBF). Hence the control systems were designed to be robust, autonomous, and easily overridden by the operator and/or programmer when needed.

Current security techniques for ICS include network level security using firewalls, internet packet diodes and high security level password protected gateways. These security techniques are designed to prevent unauthorized access through the internet.

Cyber security is the protection of computer systems from the theft or damage to their hardware, software or information, as well as from disruption or misdirection of the services they provide or the tasks they should perform. Cyber security includes controlling physical access to the hardware, as well as protecting against harm that might come via network access, data and code injection.

Cyber security is attained by the use of three main processes: prevention, detection and response.

Prevention systems attempt to detect a threat before any damage is done.

Detection systems attempt to detect any damage, disruption or misdirection and e.g., alert.

Reaction systems intended to react to threats upon detection.

SUMMARY

According to an aspect of the present invention there is provided a threat detection system for industrial controllers, comprising: at least one Programmable Logic Controller (PLC); at least one physical device connected with the PLC; a Deterministic Fictitious Programmable Logic Controller (DFPLC) deterministically programmed to respond with at least one predetermined signal to at least one input signal received; and a monitoring unit connected with the DFPLC; the DFPLC disguised as a PLC; and the monitoring unit configured to send at least one input signal to the DFPLC, receive at least one response from the DFPLC and communicate at least one alert upon the at least one response being other than an expected response according to the deterministic programming of the DFPLC.

According to another aspect of the present invention there is provided an industrial control system, comprising: an information technology (IT) layer connected to the internet; a DeMilitarized Zone (DMZ) layer connected with the IT layer; and an operational technology (OT) layer connected with the DMZ layer; the OT layer comprises the threat detection system for industrial controllers described above.

According to another aspect of the present invention there is provided a method of detecting threats in industrial systems, comprising: sending, by a monitoring unit, at least one input signal to a Deterministic Fictitious Programmable Logic Controller (DFPLC) deterministically programmed to respond with at least one predetermined signal to at least one input signal received; the DFPLC disguised as a PLC; receiving, by the monitoring unit at least one response from the DFPLC; and providing, by the monitoring unit, at least one alert upon the at least one response being other than an expected response according to the deterministic programming of the DFPLC.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1:
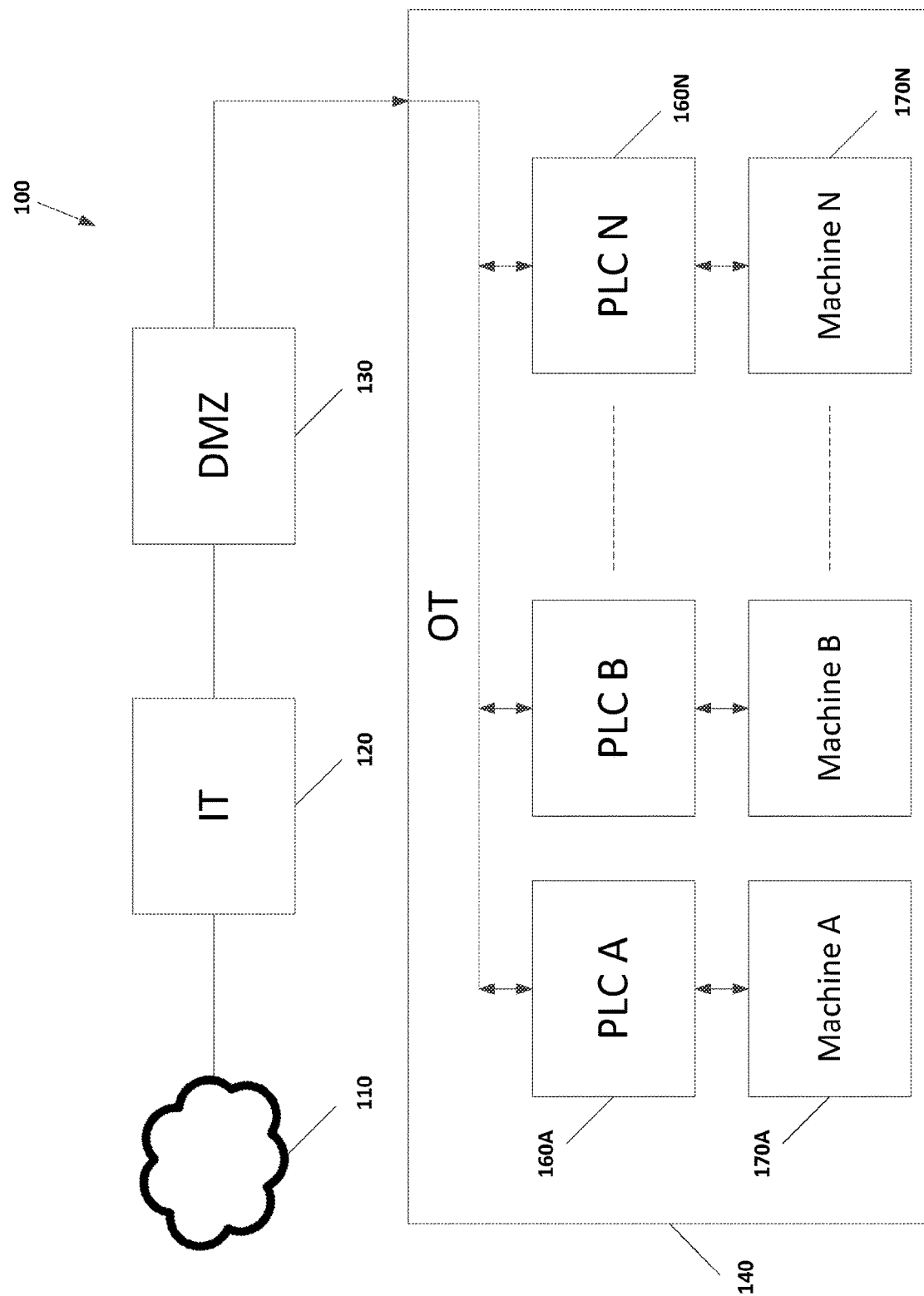
FIG. 1 is a schematic view of an exemplary existing industrial control system.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention, in some embodiments thereof, relates to a detection layer for monitoring industrial control systems (ICS).

Since the whole historical design concepts of ICS were not security oriented, a set of misconceptions, such as security through obscurity and/or physical layer protection have led to an erroneous sense of security by ICS managers. Such security measures do not prevent access to the PLCs.

Beyond physical security access, such as locked control boxes, there are no security measures or monitoring at the PLC level of ICSs. Thus there exists an urgent security risk, and the mitigation of this risk is the goal of some aspects of the embodiments of the invention.

The enormous potential damage combined with embedded vulnerabilities make ICS high profile targets for malicious attacks. Critical national infrastructural damage will affect directly the public health and safety, and is a high profile target and threat to homeland security. The install base of ICSs is extremely large and mostly defenseless, eager for security solutions. The industry cannot afford to replace and/or upgrade existing control systems to comply with the threats and/or upcoming changes in regulations. Any monitoring system that offers to secure existing hardware will have an advantage.

ICSs were designed to be highly reliable and operate in extreme environmental conditions, such as temperature, humidity, vibration, etc. This results in a very conservative industry, very careful and slow to adopt new technologies or changes. In addition the cost of replacing ICS hardware is extremely high. Any monitoring system needs to overlay the existing control systems, offering a full solution for existing hardware without interrupting operations or requiring control system changes.

ICSs are considered, incorrectly, as inherently secure, and only recently have their vulnerabilities become a growing source of concern. For example, the Stuxnet viruses to attack the Iranian nuclear fuel production infrastructure, or the breach of the Maroochy Water Services in Queensland, Australia. Therefore the security solutions for ICS, unlike those for information technology (IT) networks, are in an early stage of development and most current solutions are migrated solutions from the IT world that protect against unauthorized access from the internet. These solutions and approaches for securing an ICS network are focused on the communication layers and gateways, and not the PLC internal and/or external hardware interfaces. Unlike IT systems, ICSs have defined endpoint interactions with real world processes through hardware input and/or output (I/O) lines, resulting in clear operational outcomes. When the hardware interfaces are affected by an attack, the cyber defense may fail and might or might not detect the violation. Therefore, the critical defense point, and last line of defense, is the hardware interface between the PLC and the real world processes.

Most existing solutions are supplied by the PLC manufacturers and require a vast and extremely costly hardware upgrades. Existing solutions are tailor made for each manufacturer, model, and/or protocol, requiring integration per each different product line, and for any future products.

The present invention provides a cost effective solution for maintaining ICS security.

According to some embodiments of the present invention there is provided a monitoring system, which may comprise a method, a monitoring unit and a Deterministic Fictitious PLC (DFPLC), comprising a deterministic program logic, i.e. input X to the DFPLC may only result in output Y. The combined hardware devices and software methods may monitor and identify cyber-attacks and/or any abnormal operation in industrial control systems (ICSs) and/or supervisory control and data acquisition (SCADA) systems. The monitoring unit connected to the DFPLC may receive data from the DFPLC system bus and/or I/O lines. During monitoring, received operation data may be processed for anomaly. Based on the calculated anomalies, alerts may be sent to the appropriate response personnel of the ICS. This approach may result in protection of critical ICS operations with minimal infrastructure changes.

Occasionally, when a malicious entity wishes to do damage, it penetrates some of the system's Programmable Logic Controllers (PLCs) and changes their instructions (commands and/or parameters). It is very common that attackers try to penetrate into many PLCs and do minor changes thus, there is a high probability that the DFPLC will be "touched" and then even the tiniest change will result with an alert.

Additionally, in some cases the malicious entity reports back that everything is working properly. That way, once the malicious entity penetrates the prevention layer of the system, with no detection system, it may continue harming the system for a long time, until detected, if detected, through faulty system operation.

FIG. 1 is a schematic view of an exemplary existing industrial control system 100, comprising: an information technology (IT) layer 120 connected to the internet 110, a DeMilitarized Zone (DMZ) layer 130 which serves as a prevention layer and is connected with the IT layer 120, an operational technology (OT) layer 140 connected with the DMZ layer 130 and comprising at least one Programmable Logic Controller (PLC) 160A-160N and at least one physical device 170A-170N, such as pumps, meters, valves, heaters, robots, actuators, etc. each connected to its respective PLC, e.g., via the PLC's I/O lines.

It will be appreciated that more than one physical device may be connected to a single PLC.

It will be appreciated that the IT layer 120 may be connected to the internet 110 via a firewall.

The IT layer 120 comprises any networking, storage, computers and other physical devices, processes and infrastructure to store, process, create, secure and exchange all forms of electronic data.

The DMZ layer 130 is a physical or logical sub network that contains and exposes the system's external-facing services to the Internet. The purpose of a DMZ is to add an additional layer of security to the system. An external network node can access only what is exposed in the DMZ, while the rest of the system's network is firewalled.

The OT layer 140 comprises hardware and software for detecting, controlling and/or regulating system processes and physical devices such as pumps, valves, etc. The OT layer comprises systems that process operational data including computer systems, electronics, telecommunications, technical components, etc. and may be intended to control physical devices, e.g., open a valve, activating an engine, etc. and/or regulate various process values such as pressure or temperature, etc.

According to embodiments of the present invention, the OT layer may include a Human Machine Interface (HMI) used to monitor and control the system's technical processes.

Figure 2:
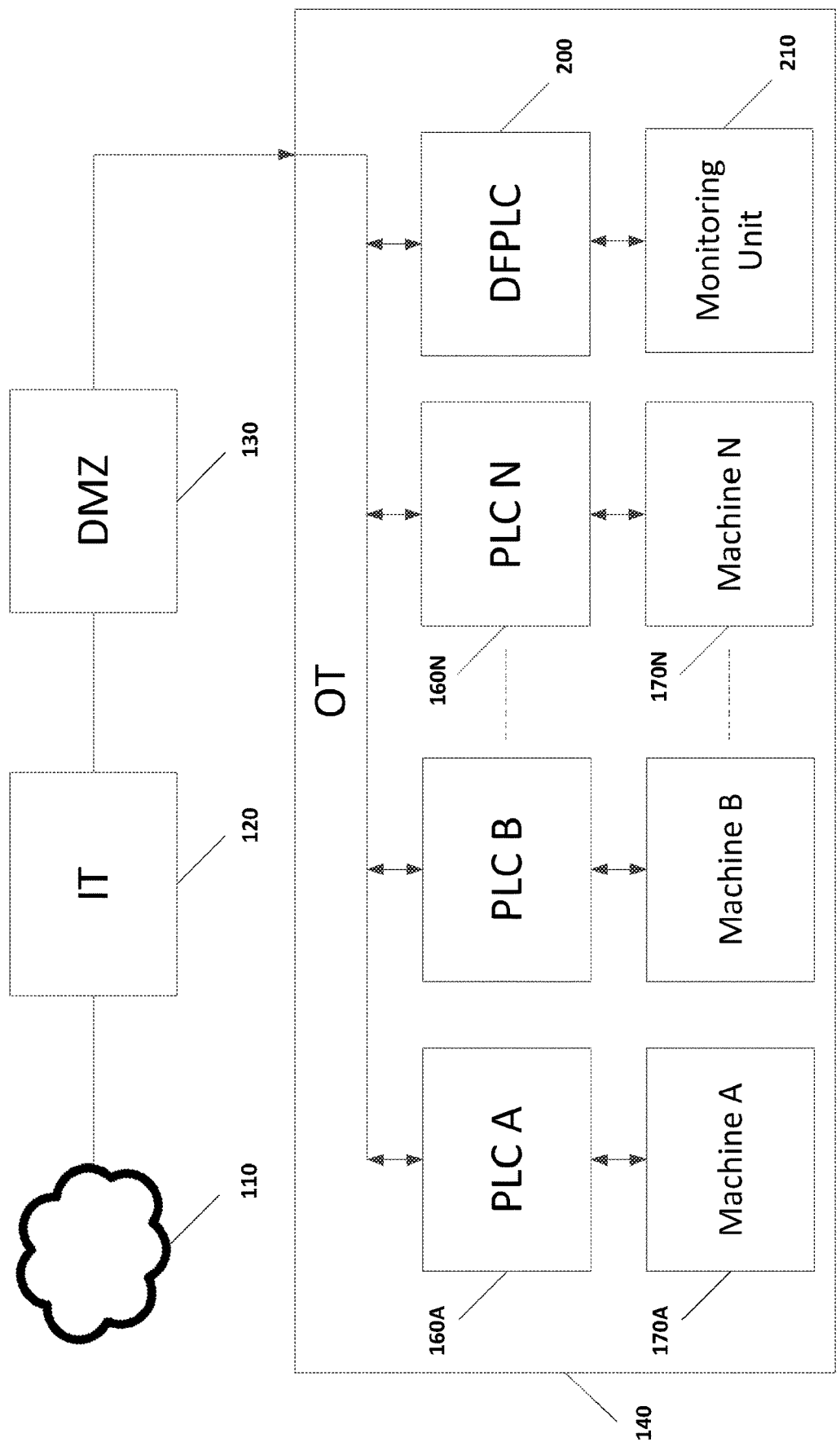
FIG. 2 is a schematic view of the system of FIG. 1 with the Deterministic Fictitious PLC (DFPLC) and the monitoring unit according to embodiments of the present invention.

FIG. 2 is a schematic view of the system of FIG. 1 with the Deterministic Fictitious PLC (DFPLC) 200 and the monitoring unit 210 according to embodiments of the present invention. The DFPLC 200 is connected as one of the system's PLCs and disguised as one of them. On its other end, the DFPLC is connected with the monitoring unit 210 which monitors the DFPLC's activity. The DFPLC 200 receives a flow of incoming factitious sensors' signals (e.g., via its I/O lines) from the monitoring unit 210, which in return expects to receive back from the DFPLC corresponding signals (predetermined), consistent with its deterministic programming. Since the monitoring unit 210 expects specific signals in response to each input or inputs set sent to the DFPLC 200, it is able to detect if a malicious entity tries to change the DFPLC's performance, i.e., logic and/or parameters. The DFPLC 200 acts as one of the regular PLCs (160A-160N) by running its logic based on the inputs sent by the monitoring unit 210 and responding with signals accordingly in order to blend among the regular PLCs and not be detected as a fictitious PLC.

Thus, any attack intended to manipulate or harm the DFPLC's logic, i.e. program commands and/or parameters, may be detected by the monitoring unit 210 and reported either by wired or wireless connection to the client by an email, a phone call, an alert notification, the HMI, etc.

It will be appreciated that the DFPLC 200 and the monitoring unit 210 of the present invention may be installed in a system comprising more or less components than the ones presented in FIGS. 1 and 2. To clarify, the internet 110, the IT layer 120 and the DMZ 130 are optional and presented for the purpose of demonstration of an exemplary system. The mandatory components of the present invention are the OT layer 140 including at least the DFPLC 200 and the monitoring unit 210 of the present invention.

Figure 3:
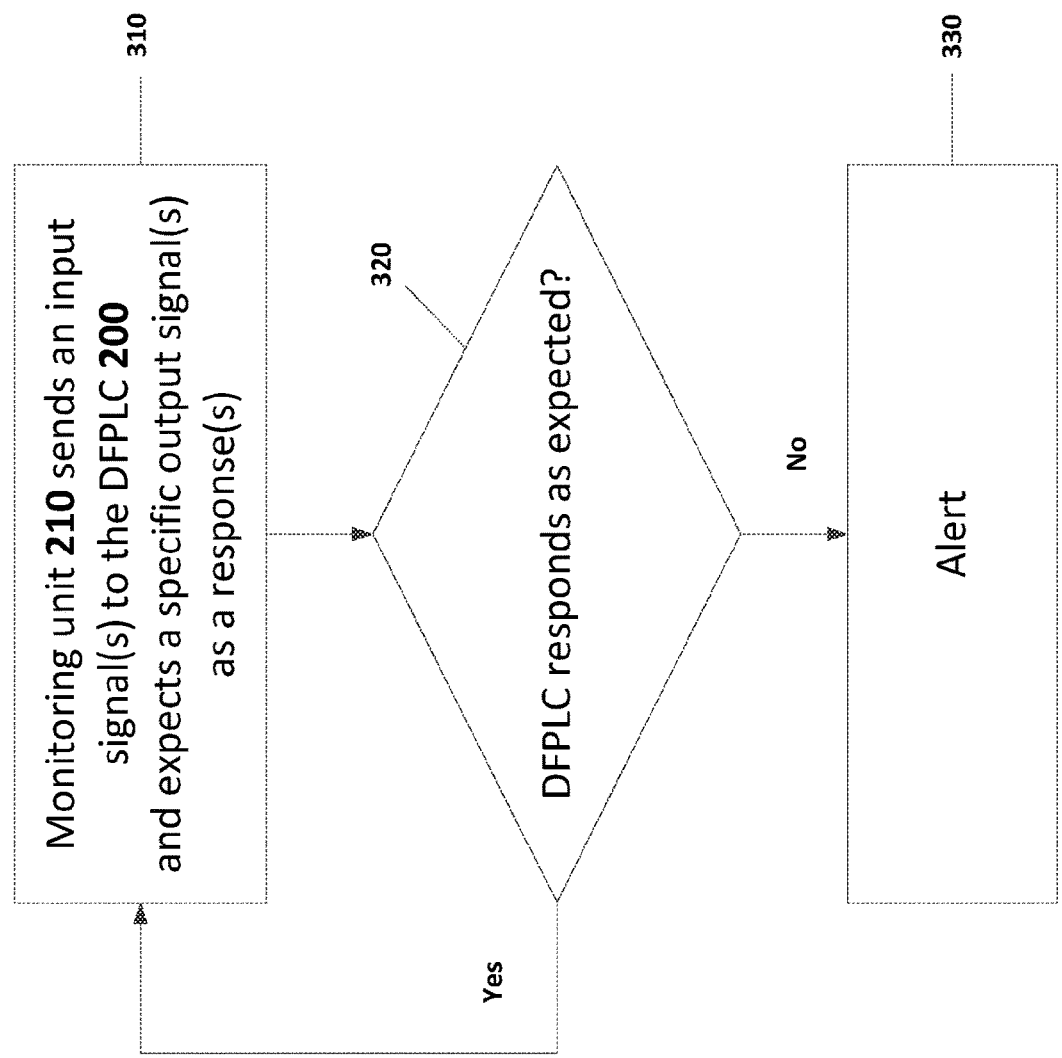
FIG. 3 is a flowchart showing the process performed by the DFPLC and the monitoring unit according to embodiments of the invention.

FIG. 3 is a flowchart showing the process performed by the DFPLC 200 and the monitoring unit 210 according to embodiments of the invention. In step 310 the monitoring unit 210 sends an input signal(s) to the DFPLC 210 and expects a specific output signal(s) as a response(s). If in step 320 the DFPLC 210 responds as expected, the process loops back to step 310. Otherwise, in step 330 the monitoring unit 210 alerts.

It will be appreciated by persons skilled in the art that the present invention is not limited to what has been particularly shown and described hereinabove. Rather the scope of the present invention is defined by the appended claims and includes combinations and sub-combinations of the various features described hereinabove as well as variations and modifications thereof which would occur to persons skilled in the art upon reading the foregoing description.

The invention claimed is:

1. A threat detection system for industrial controllers, comprising:
   at least one Programmable Logic Controller (PLC);
   at least one physical device connected with said PLC;
   a Deterministic Fictitious Programmable Logic Controller (DFPLC) comprising a deterministic program logic; said DFPLC deterministically programmed and configured to receive at least one input signal and respond with at least one predetermined signal according to said logic; and
   a monitoring unit connected with said DFPLC;
   said DFPLC disguised as a PLC; and
   said monitoring unit configured to send at least one input signal to said DFPLC, receive at least one response from said DFPLC and communicate at least one alert upon said at least one response being other than an expected response according to said deterministic programming of said DFPLC.

2. An industrial control system, comprising:
   an information technology (IT) layer connected to the internet;
   a DeMilitarized Zone (DMZ) layer connected with said IT layer; and
   an operational technology (OT) layer connected with said DMZ layer;
   said OT layer comprises the threat detection system for industrial controllers of claim 1.

3. A method of detecting threats in industrial systems, comprising:
   sending, by a monitoring unit, at least one input signal to a Deterministic Fictitious Programmable Logic Controller (DFPLC) comprising a deterministic program logic; said DFPLC deterministically programmed and configured to receive at least one input signal and respond with at least one predetermined signal according to said logic;
   said DFPLC disguised as a PLC;
   receiving, by said monitoring unit at least one response from said DFPLC; and
   providing, by said monitoring unit, at least one alert upon said at least one response being other than an expected response according to said deterministic programming of said DFPLC.

\* \* \* \* \*